US009565059B1

(12) United States Patent
Manmohan et al.

(10) Patent No.: US 9,565,059 B1
(45) Date of Patent: Feb. 7, 2017

(54) SYSTEMS AND METHODS FOR DYNAMICALLY CONFIGURING COMPUTING SYSTEM GROUP ASSIGNMENTS BASED ON DETECTED EVENTS

(71) Applicant: Symantec Corporation, Mountain View, CA (US)

(72) Inventors: Sarin Sumit Manmohan, Pune (IN); Milind Torney, Pune (IN); Dirk Kessler, San Francisco, CA (US); Mario Espinoza, Foster City, CA (US)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 14/448,770

(22) Filed: Jul. 31, 2014

(51) Int. Cl.

| *G06F 15/177* | (2006.01) |
| *H04L 12/24* | (2006.01) |
| *G06F 21/55* | (2013.01) |
| *H04L 29/06* | (2006.01) |
| *G06F 21/56* | (2013.01) |
| *G06F 21/57* | (2013.01) |

(52) U.S. Cl.
CPC ......... *H04L 41/0813* (2013.01); *G06F 21/554* (2013.01); *G06F 21/566* (2013.01); *G06F 21/577* (2013.01); *H04L 63/20* (2013.01)

(58) Field of Classification Search
CPC .... G06F 21/554; G06F 21/566; G06F 21/577; H04L 63/20; H04L 41/0813
See application file for complete search history.

(56) References Cited

U.S. PATENT DOCUMENTS

| 8,458,301 | B1 * | 6/2013 | Andrus | ............... | H04L 41/0816 709/220 |
| 8,887,291 | B1 * | 11/2014 | Mears | ................. | G06Q 10/00 713/182 |
| 9,026,632 | B2 * | 5/2015 | Bryskin | ................. | H04L 45/02 709/220 |
| 2013/0097662 | A1 * | 4/2013 | Pearcy | ................. | G06F 21/577 726/1 |

OTHER PUBLICATIONS

"Websense", http://www.websense.com/content/home.aspx, as accessed Jun. 18, 2014, (Oct. 24, 2008).
"McAfee", http://www.mcafee.com/us/, as accessed Jun. 18, 2014, (Feb. 29, 2000).
"RSA", http://www.emc.com/domains/rsa/index.htm, as accessed Jun. 18, 2014, EMC Corporation, (Feb. 27, 2012).

* cited by examiner

*Primary Examiner* — Mohamed Wasel
(74) *Attorney, Agent, or Firm* — FisherBroyles LLP (57) ABSTRACT

A computer-implemented method for configuring computing systems may include (1) detecting an event associated with a client device that potentially impacts a group to which the client device is assigned and, in response to detecting the event, (2) discovering at least one attribute of the client device that has the potential to impact the client device's group assignment, (3) identifying at least one rule that defines conditions for assigning client devices to groups, (4) determining, by applying the rule to the discovered attribute of the client device, that the client device's group assignment should be modified, and (5) modifying, in response to determining that the client device's group assignment should be modified, the client device's group assignment based on the discovered attribute of the client device. Various other methods, systems, and computer-readable media are also disclosed.

20 Claims, 6 Drawing Sheets

SYSTEMS AND METHODS FOR DYNAMICALLY CONFIGURING COMPUTING SYSTEM GROUP ASSIGNMENTS BASED ON DETECTED EVENTS

BACKGROUND

Several technological trends combine to make organizations increasingly dynamic. The Internet makes it possible for people to collaborate over long distances. Virtual networks make it possible for these distributed collaborators to have secure access to a centrally managed set of computing resources, as if they were all working at one location. Social networks provide opportunities for people with common interests or objectives to find each other. Mobile computing and cloud computing enable people to work wherever they happen to be. These trends, taken together, are fundamentally changing the nature of organizations. People who once worked as an employee of a company for several years, now find they can work on a project as a contractor or consultant for a few months, then move on to another job at another company, or even work for several employers at once.

Add to the trends listed above the proliferation of computing devices—desktop computers, laptops, tablets, smartphones—and the result is a complex set of challenges for those who need to manage and secure all those devices. A laptop computer may log in to the organization's network at the office in the morning, over a public network in the afternoon, and from a home network in the evening. Smartphones may move between cellular and wireless networks from hour to hour. A desktop computer that is in a stationary location in the office may be used by different users from one day to the next. Unfortunately, each change of users or locations, or organizational affiliation, may require configuration changes to the computing device being used. For example, data loss prevention policies may change according to device and location. Similarly, changes in the set of application programs used by different users may require configuration changes to a device to resolve conflicts between applications or between applications and the device's operating system. Accordingly, the instant disclosure identifies and addresses a need for additional and improved systems and methods for configuring computing systems.

SUMMARY

As will be described in greater detail below, the instant disclosure describes various systems and methods for configuring computing systems by assigning computing devices to groups according to sets of attributes discovered on each computing device. As events occur that potentially impact a device's group assignment, the systems and methods described herein may apply rules to determine whether a group change is required. The systems and methods described herein may then change the group assignment as required and apply the associated configuration changes to the device. Where rules assigning devices to conflicting groups are discovered, the systems and methods described herein may either take measures to resolve the conflict, or make an initial group assignment and notify an administrator of the need to create a new rule to resolve the conflict.

In one example, a computer-implemented method for configuring computing systems may include (1) detecting an event associated with a client device that potentially impacts a group to which the client device is assigned and, in response to detecting the event, (2) discovering at least one attribute of the client device that has the potential to impact the client device's group assignment, (3) identifying at least one rule that defines conditions for assigning client devices to groups, (4) determining, by applying the rule to the discovered attribute of the client device, that the client device's group assignment should be modified, and (5) modifying, in response to determining that the client device's group assignment should be modified, the client device's group assignment based on the discovered attribute of the client device.

In some examples, identifying the rule that defines conditions for assigning client devices to groups may include (1) identifying rules that define conditions for assigning the client device to groups, (2) determining that the client device satisfies conditions of more than one group, resulting in a conflict, (3) resolving the conflict between the groups, and (4) in response to resolving the conflict between the groups, modifying the client device's group assignment. In some examples, resolving the conflict between the groups may include determining that one of the conflicting groups is a superset of all other conflicting groups and/or determining that one of the conflicting groups is a proper subset of all other conflicting groups. In some examples, resolving the conflict between the groups may include selecting a rule from the rules that assign devices to conflicting groups to modify the client device's group assignment, and notifying an administrator to formulate a new rule that resolves the conflict.

In some examples, the computer-implemented method may further include identifying a configuration setting of the attribute that improves the utility of the client device. In these examples, the rule that defines conditions for assigning client devices to groups may initiate application of the configuration setting to the attribute of the client device. In one embodiment, the rule that defines conditions for assigning client devices to groups may initiate application of the configuration setting to the attribute of the client device. In addition, the computer-implemented method may further include, in response to determining that the client device's group assignment should be modified, applying the configuration setting to the attribute of the client device.

In one embodiment, the attribute may include a data loss prevention policy, a directory services setting, a software application configuration setting, a network setting, a device resource setting, an operating system configuration setting, and/or a device security setting. In some examples, discovering the attribute of the client device may include discovering at least one attribute of a user of the client device. In one embodiment, the event associated with the client device may include a login event, a device security threat event, a directory services change event, a software application change event, a network connection event, a device change event, and/or an operating system configuration event.

In some examples, identifying the rule that defines conditions for assigning client devices to groups may include obtaining, using information that identifies the discovered attribute of the client device, the rule by querying a database that associates group assignment conditions with group assignment rules, and/or formulating a rule that associates at least one condition associated with the client device with a group. In one embodiment, the condition for assigning client devices to groups may include a logical combination of attributes of client devices.

In one embodiment, a system for implementing the above-described method may include several modules stored in memory, such as (1) an event module that detects an event associated with a client device that potentially impacts a group to which the client device is assigned, (2) a client analysis module that, in response to detecting the event, discovers one or more attributes of the client device that have the potential to impact the client device's group assignment, (3) a rule analysis module that identifies at least one rule that defines conditions for assigning client devices to groups, (4) an assignment module that determines, by applying the rule to the discovered attribute of the client device, that the client device's group assignment should be modified and, in response to determining that the client device's group assignment should be modified, modifies the client device's group assignment based on the discovered attribute of the client device. The system may also include one or more physical processors configured to execute the event module, the client analysis module, the rule analysis module, and the assignment module.

In some examples, the above-described method may be encoded as computer-readable instructions on a non-transitory computer-readable medium. For example, a computer-readable medium may include one or more computer-executable instructions that, when executed by one or more processors of a computing device, may cause the computing device to (1) detect an event associated with a client device that potentially impacts a group to which the client device is assigned, (2) discover one or more attributes of the client device that have the potential to impact the client device's group assignment, (3) identify one or more rules that define conditions for assigning client devices to groups, (4) determine, by applying the rule to the discovered attribute of the client device, that the client device's group assignment should be modified, and (5) in response to determining that the client device's group assignment should be modified, modify the client device's group assignment based on the discovered attribute of the client device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for configuring computing systems. As will be explained in greater detail below, the systems and methods described herein may facilitate configuration management of computing devices by assigning devices to groups associated with device attributes. For example, the systems and methods described herein may detect events that potentially affect desired configuration settings for devices, apply a rule to determine if configuration changes are necessary, change device group assignments according to the rule applied, and initiate the configuration changes associated with the group assignment. The systems and methods described herein may also detect and resolve conflicts between groups.

Figure 1:
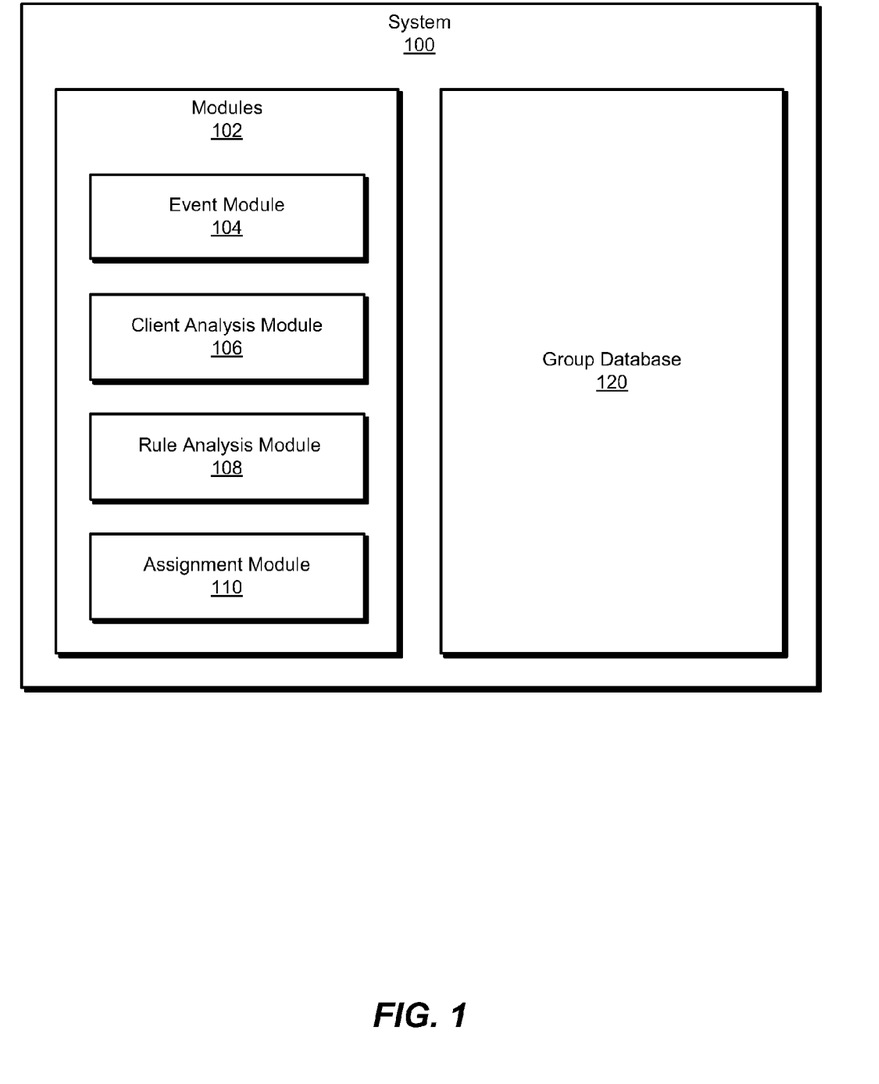
FIG. 1 is a block diagram of an exemplary system for configuring computing systems.
Figure 2:
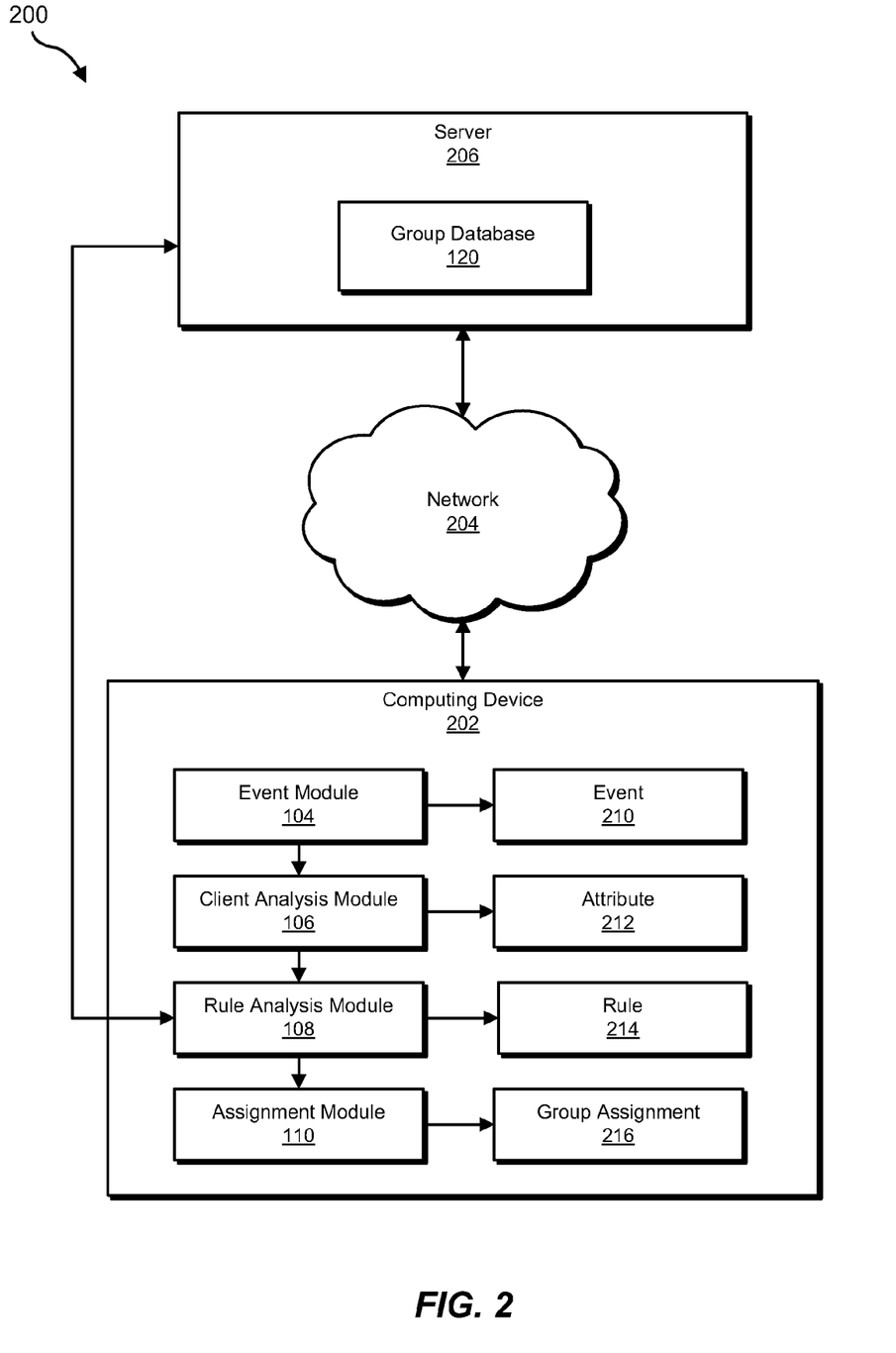
FIG. 2 is a block diagram of an additional exemplary system for configuring computing systems.
Figure 3:
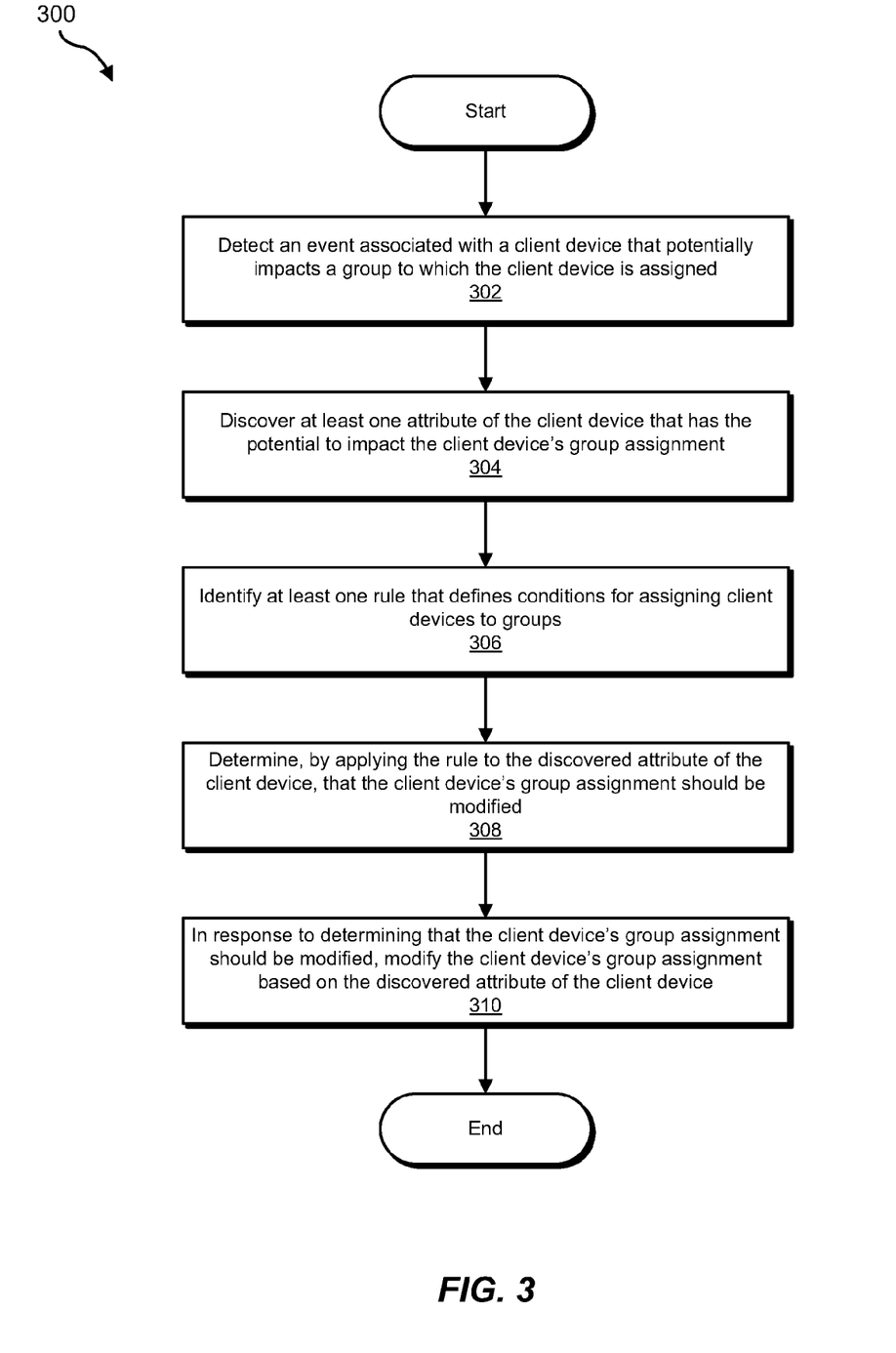
FIG. 3 is a flow diagram of an exemplary method for configuring computing systems.
Figure 4:
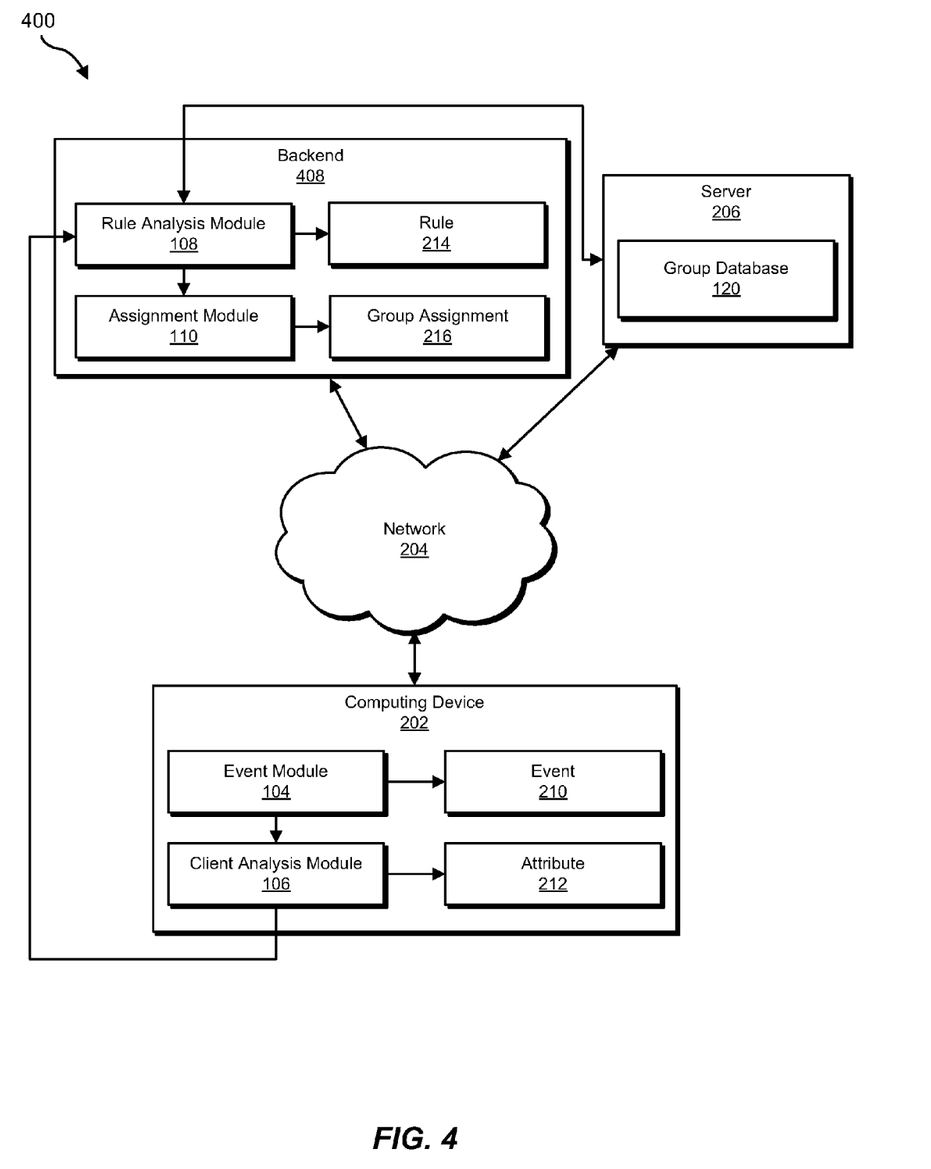
FIG. 4 is a block diagram of an alternatively-configured exemplary system for configuring computing systems.

The following will provide, with reference to FIGS. 1, 2, and 4 detailed descriptions of exemplary systems for configuring computing systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for configuring computing systems. As illustrated in this figure, exemplary system 100 may include one or more modules 102 for performing one or more tasks. For example, and as will be explained in greater detail below, exemplary system 100 may also include an event module 104 that may detect an event associated with a client device that potentially impacts a group to which the client device may be assigned. Exemplary system 100 may additionally include a client analysis module 106 that may discover one or more attributes of the client device that have the potential to impact the client device's group assignment. Exemplary system 100 may also include a rule analysis module 108 that may identify rules that define conditions for assigning client devices to groups. Exemplary system 100 may additionally include an assignment module 110 that may determine, by applying the rule to the discovered attribute of the client device, that the client device's group assignment should be modified. Assignment module 110 may also, in response to determining that the client device's group assignment should be modified, modify the client device's group assignment based on the discovered attribute of the client device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as group database 120. In one example, group database 120 may be configured to store device group assignments and/or rules for assigning devices to device groups. Group database 120 may represent portions of a single database or computing device or a plurality of databases or computing devices. For example, group database 120 may represent a portion of server 206 in FIG. 2, computing system 510 in FIG. 5, and/or portions of exemplary network architecture 600 in FIG. 6. Alternatively, group database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in group database 120. Additionally or alternatively, server 206 may be programmed with one or more of modules 102 and/or may store all or a portion of the data in group database 120.

In one embodiment, one or more of modules 102 from FIG. 1 may, when executed by at least one processor of computing device 202 and/or server 206, enable computing device 202 and/or server 206 to configure computing systems. For example, and as will be described in greater detail below, event module 104 may detect an event 210 associated with an attribute 212 that potentially impacts a group to which computing device 202 is assigned. Client analysis module 106 may then discover that attribute 212 has the potential to impact a group assignment 216 for computing device 202. In response, rule analysis module 108 may identify a rule 214 that defines conditions for assigning client devices to groups. Assignment module 110 may then determine, by applying rule 214 to the discovered attribute 212 of computing device 202, that group assignment 216 of computing device 202 should be modified. Finally, assignment module 110 may, in response to determining that group assignment 216 for computing device 202 should be modified, modify the group assignment 216 for computing device 202 based on the discovered attribute 212 of computing device 202.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for configuring computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect an event associated with a client device that potentially impacts a group to which the client device is assigned. For example, at step 302 event module 104 may, as part of computing device 202 in FIG. 2, detect an event 210 associated with computing device 202 that potentially impacts a group to which computing device 202 is assigned. In some examples, the systems and methods described herein may facilitate configuration management of computing devices by assigning devices to groups associated with device attributes.

Event module 104 may detect a number of types of events, and in various ways. For example, event module 104 may detect a login event. If the user logging in to the device is different than the user who last logged in to the device, then a device configuration change may be desirable or necessary. For example, different users may have access to different sets of software applications. Applications may conflict with each other or with the device's operating system in ways that can be resolved by a device configuration change. Likewise, a software application change (such as a software application being installed, uninstalled, or updated) may require a similar configuration change. User changes or application changes may also necessitate a change in the data loss prevention policy associated with the device.

Event module 104 may also detect a device security threat event, such as detection of a malware infection. A device security threat event may indicate a need for configuration changes to the device, such as a change to the data loss prevention policy associated with the device, blocking access to sensitive data, or reconnection to a network outside the organization's firewall. Configuration changes may also be indicated when event module 104 detects a network connection event, such as the device reconnecting from a network outside the organization's firewall to a network inside the firewall, a directory services change event, such as the device's user being reassigned to a different organizational unit, or a change to the device's location attribute in the directory.

Event module 104 may also detect a device change event, such as installation or connection of a peripheral device, or an operating system configuration event, such as installation of an operating system update. These events may, for example, indicate a need for configuration changes to resolve conflicts between software applications and installed devices or the operating system, or between connected devices and the operating system. Any of the events described above may indicate a need for configuration changes to the device, and therefore a change to the group to which the device is assigned.

Event module 104 may detect the various types of events in a number of ways. For example, device operating systems typically provide event handling systems that provide notification with many types of events associated with the device. Other events may be detected by monitoring configuration files for changes.

At step 304, one or more of the systems described herein may discover at least one attribute of the client device that has the potential to impact the client device's group assignment. For example, at step 304 client analysis module 106 may, as part of computing device 202 in FIG. 2, discover at least one attribute 212 that has the potential to impact the group assignment 216 for computing device 202.

The term "attribute," as used herein, generally refers to a quality or feature of the computing device or related to the computing device that is associated with a configurable feature of the computing device. In some examples, the attribute itself may be the configurable feature. In some examples, client analysis module 106 may discover the attribute of the client device by discovering one or more attributes of a user of the client device. For example, one attribute of a computing device may be a data loss prevention policy associated with the device. If event module 104 detects that a new user has logged in to the computing device, client analysis module 106 may determine that a data loss prevention policy associated with the device may need to be changed, and therefore the device's group assignment may also need to be changed.

Other attributes that client analysis module 106 may determine to have the potential to affect the device's group assignment include, without limitation, directory services settings (such as the location attribute associated with the device or the organizational unit to which the user logged in to the device is assigned), software application configuration settings (such as a particular application or application version being installed on the device), network settings (such as the network to which the device is currently attached), device resource settings (such as connected peripheral devices), operating system configuration settings (such as the operating system version installed), and/or device security settings (such as the security login after screen saver timeout setting).

Client analysis module 106 may discover attributes of the client device that have the potential to impact the client device's group assignment in a variety of ways. For example, client analysis module 106 may access a list of attributes associated with the event detected by event module 104. Additionally or alternatively, client analysis module 106 may obtain a list of attributes included in rules maintained in group database 120.

At step 306, one or more of the systems described herein may identify one or more rules that define conditions for assigning client devices to groups. For example, at step 306 rule analysis module 108 may, as part of computing device 202 in FIG. 2, identify rule 214 that defines conditions for assigning client devices to groups, and potentially may change group assignment 216 for computing device 202.

Rule analysis module 108 may identify rules for assigning client devices to groups in any suitable manner. For example, rule analysis module 108 may identify the rule that defines conditions for assigning client devices to groups by obtaining the rule by querying a database that associates group assignment conditions with group assignment rules, using information that identifies the discovered attribute of the client device. For example, when event module 104 detects a network connection event in which the device changes its network connection from a virtual private network to a public wireless network, client analysis module 106 may determine that the changed network setting attribute associated with the network change event may indicate the need for a change in the device's group assignment. Rule analysis module 108 may subsequently query group database 120 with the network setting attribute to obtain a rule that assigns the device to a group according to the network setting attribute.

In another example, rule analysis module 108 may identify the rule that defines conditions for assigning client devices to groups by dynamically formulating a rule that associates one or more conditions associated with the client device with a group. In the example above, instead of querying group database 120, rule analysis module 108 may determine that the move from a secure network to a public network indicates the need for a change to a more secure data loss prevention policy for the device, and dynamically formulate a rule assigning the device to a group associated with a secure data loss prevention policy, based on the condition of the network setting attribute.

In some examples, the process for identifying the rule to apply in assigning the computing device to a group may involve resolving a conflict between two or more groups. In these examples, rule analysis module 108 may identify the rule that defines conditions for assigning client devices to groups by (1) identifying two or more rules that define conditions for assigning the client device to groups, (2) determining that the client device satisfies conditions of multiple rules, resulting in a conflict, (3) resolving the conflict between the groups, and (4) in response to resolving the conflict between the groups, modifying the client device's group assignment.

In one example, the process for resolving the conflict between groups may include using set operations to select the group to be used in assigning the device to a group. For example, rule analysis module 108 may resolve the conflict between the groups by determining that one of the conflicting groups is a superset of all other conflicting groups. For example, rule analysis module 108 may determine that a rule assigns the device to a group with a directory services location attribute assigned to "California," based on the location of the device, as determined by the location of the network to which the device is attached. Rule analysis module 108 may also determine that a rule assigns the device to a group with a directory services location attribute assigned to "New York," based on the user's organizational unit directory services assignment. Rule analysis module 108 may then determine that a group with a location "USA" is a superset of both the California and New York groups, and select a rule that resolves the conflict by assigning the device to the USA group. In some examples, the rule resolving the conflict may be obtained from group database 120. In addition, rule analysis module 108 may dynamically formulate the rule based on analysis of the relationship between the groups.

In another example, rule analysis module 108 may resolve the conflict between the groups by determining that one of the conflicting groups is a proper subset of all other conflicting groups. For example, rule analysis module 108 may identify rules similar to those in the previous example that assign the device to both the USA group and the California group. Rule analysis module 108 may resolve the conflict by determining that the California group is a proper subset of the USA group, and thereby determine that the appropriate rule to be applied assigns the device to the California group. As in the previous example, an administrator may have previously defined the conflict resolution rules for retrieval from rule database 120, or rule analysis module 108 may dynamically formulate the conflict resolution rule by analyzing the relationships between the conflicting groups.

In some examples, rule analysis module 108 may resolve the conflict between the groups by selecting a rule from the rules that assign devices to conflicting groups to modify the client device's group assignment and notifying an administrator to formulate a new rule that resolves the conflict between the conflicting groups. When conflicts between groups cannot be resolved by set analysis methods described above, rule analysis module 108 may select one of the conflicting groups to initially assign the device and notify an administrator that the conflict cannot be resolved by existing rules, and that a new conflict resolution rule should be formulated. In some examples, rule analysis module 108 may select a designated default group, which is not in the conflicting groups, to apply to the device and notify the administrator that the conflict cannot be resolved by existing rules.

In some examples, the condition for assigning client devices to groups includes a logical combination of attributes of client devices. For example, a rule may assign devices running MICROSOFT WINDOWS VISTA and MICROSOFT VISIO to a group. Group assignment rules may be made arbitrarily complex by using logical constructions such as AND, OR, or NOT.

At step 308, one or more of the systems described herein may determine, by applying the rule to the discovered attribute of the client device, that the client device's group assignment should be modified. For example, at step 308 assignment module 110 may, as part of computing device 202 in FIG. 2, determine, by applying rule 214 to the discovered attribute 212 of computing device 202, that group assignment 216 for computing device 202 should be modified.

Assignment module 110 may apply the rule to the discovered attribute of the client device to determine whether the client device's group assignment should be modified in a variety of ways. For example, rule analysis module 108 may identify a rule that assigns the client device to a group of devices on which MICROSOFT OFFICE is installed. Assignment module 110 may, by examining the registry of the client device, determine that MICROSOFT OFFICE has been installed on the device, and that the device's group assignment should be changed. In another example, rule analysis module 108 may identify a rule that assigns the client device to a group of devices connected to public networks. Assignment module 110 may, by identifying the network to which the device is attached, determine that the device has moved from a wired connection in the organization's offices to a public wireless network, and that the group assignment should be changed to place the device in the group of devices connected to a public network.

At step 310, one or more of the systems described herein may, in response to determining that the client device's group assignment should be modified, modify the client device's group assignment based on the discovered attribute of the client device. For example, at step 310 assignment module 110 may, as part of computing device 202 in FIG. 2, in response to determining that group assignment 216 for computing device 202 should be modified, modify group assignment 216 for computing device 202 based on discovered attribute 212 of computing device 202, as specified by rule 214.

Assignment module 110 may modify the client device's group assignment in a variety of ways. For example, assignment module 110 may, upon determining that the client device's group assignment should be modified, assign the device to the identified group in group database 120 on server 206, according to the rule identified by rule analysis module 108. In some examples, rule analysis module 108 may determine that, based on the condition of the discovered attribute, the client device should be assigned to a group that does not yet exist. In this example, assignment module 110 may create a group for the client device in group database 120.

In some examples, the systems and methods described herein may identify a configuration setting of the discovered attribute that improves the utility of the client device, where the rule that defines conditions for assigning client devices to groups initiates application of the configuration setting to the attribute of the client device. Returning to the example given above, where assignment module 110 determines that the client device has moved from a wired connection in the organization's offices to a public wireless network, and that the group assignment should be changed to place the device in the group of devices connected to a public network, the systems and modules described herein may identify a data loss prevention policy that applies to devices attached to public networks. After modifying the device's group assignment to a group of devices attached to public networks, the systems and modules described herein may initiate a change of group policy associated with the client device.

FIG. 4 is a block diagram of an alternatively configured exemplary system 400 for configuring computing systems. Exemplary system 400 includes the same modules and components as exemplary system 200, with the addition of backend 408, which, similar to server 206, represents any type or form of computing device that is capable of storing, comparing, and/or providing data. In one example, system 400 may locate device-specific modules (event module 104 and client analysis module 106) on computing device 202. Modules related to rule and group analysis (rule analysis module 108 and assignment module 110) may be located on an application server, such as backend 408. Server 206 may be a database server, hosting group database 120. Modules included in exemplary system 400 may operate in much the same manner as in exemplary system 200, but may provide a more efficient use of processor, memory, and network resources.

As described above, the systems and methods described herein may dynamically configure computing devices as these systems and methods detect events potentially affecting device configuration and as attributes related to device configuration change. The systems and methods described herein may also apply complex rules and resolve conflicts between groups to determine the proper group assignment for a device, based on current conditions, and apply the configuration changes associated with a group assignment to devices.

Figure 5:
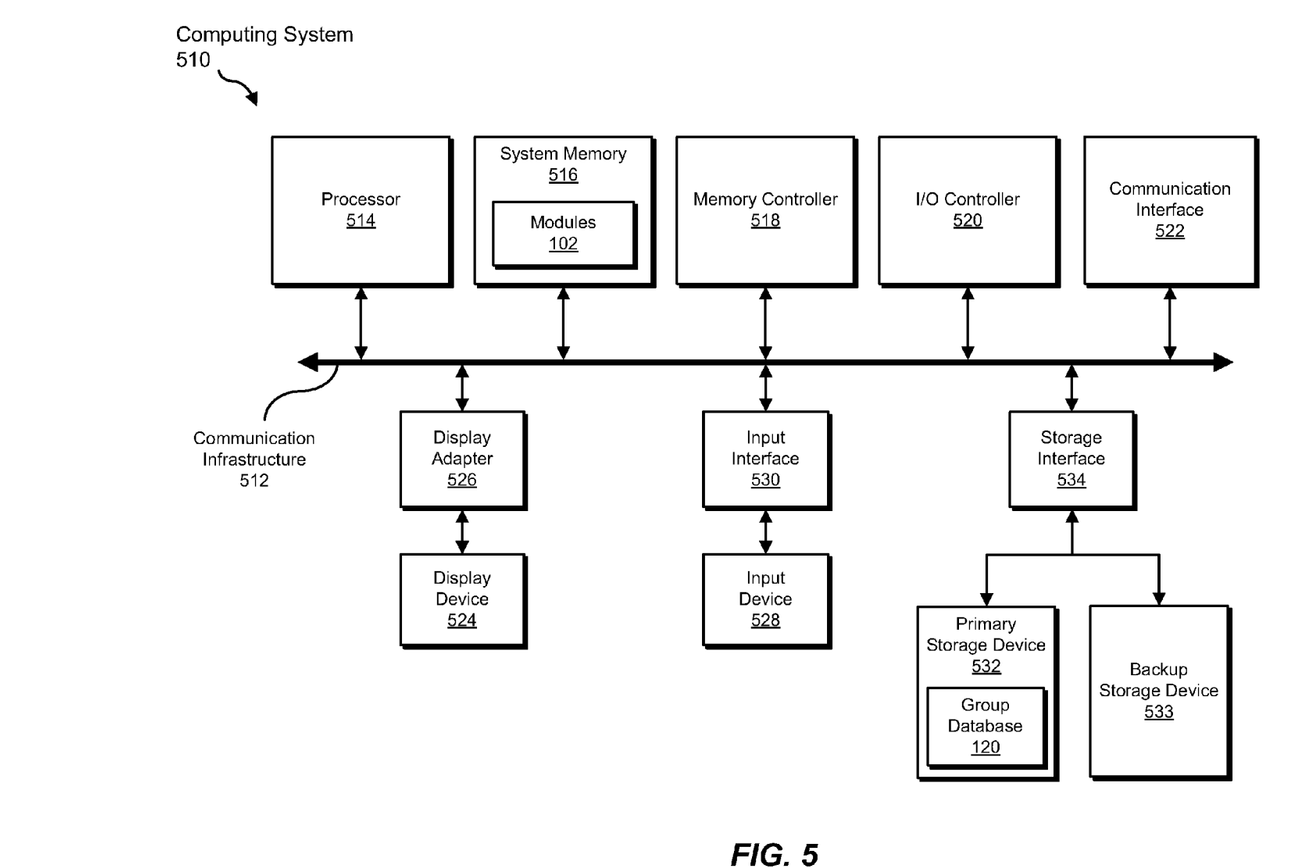
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, group database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
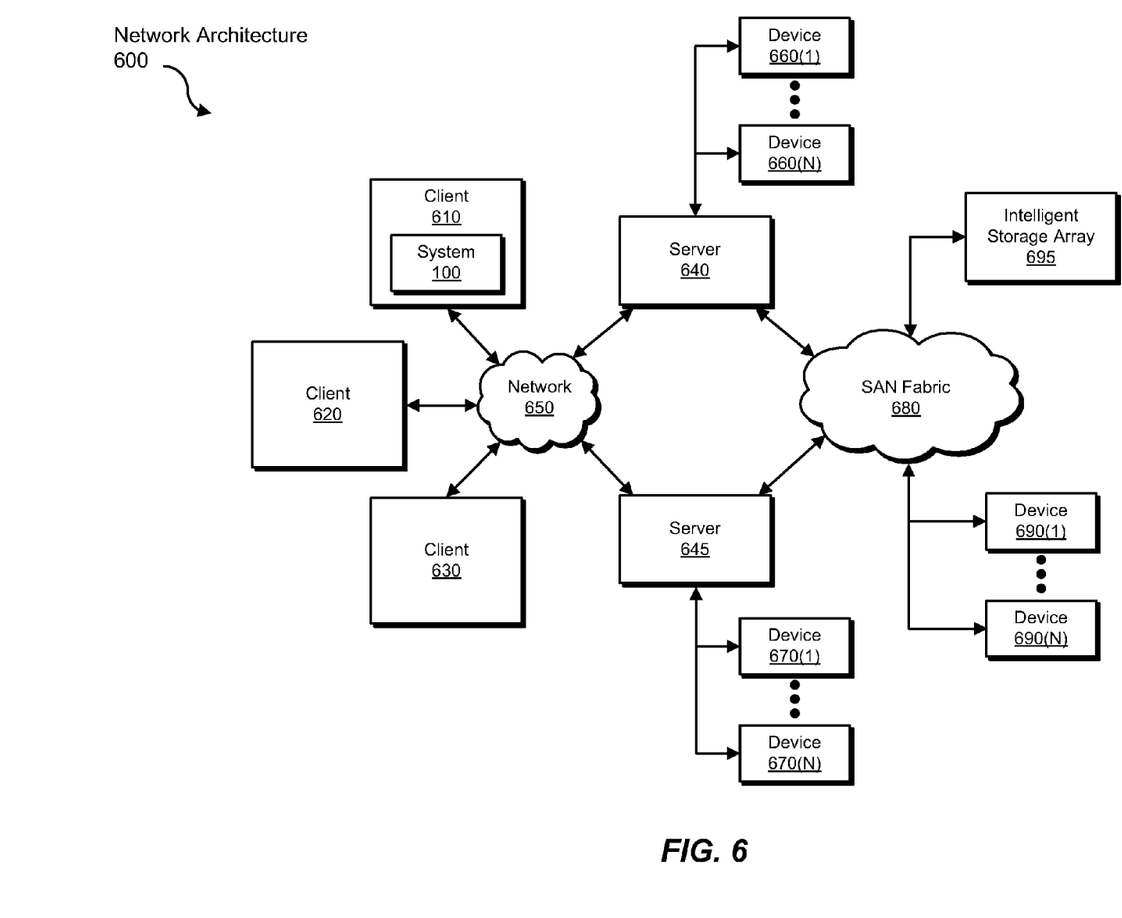
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for configuring computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, use the result of the transformation to modify client device group assignments, and store the result of the transformation to configure computing systems. Modules described herein may also transform a physical computing system into a system for configuring computing systems. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically configuring computing system group assignments based on detected events, at least a portion of the method being performed by a computing device comprising at least one processor, the method comprising:
   detecting an event associated with a client device that potentially impacts a group to which the client device is assigned;
   in response to detecting the event:
      discovering at least one attribute of the client device that potentially impacts the client device's group assignment;
      identifying at least one rule that defines conditions for assigning client devices to groups by formulating a dynamic rule that associates at least one condition associated with the client device with an alternate group;
      determining, by applying the rule to the discovered attribute of the client device, that the client device's group assignment should be modified to that of the alternate group; and
      in response to determining that the client device's group assignment should be modified, modifying the client device's group assignment based on the discovered attribute of the client device.

2. The computer-implemented method of claim 1, wherein identifying the rule that defines conditions for assigning client devices to groups comprises:
   identifying a plurality of rules that define conditions for assigning the client device to a plurality of groups;
   determining that the client device satisfies conditions of a plurality of groups, resulting in a conflict;
   resolving the conflict between the conflicting groups; and
   in response to resolving the conflict between the conflicting groups, modifying the client device's group assignment.

3. The computer-implemented method of claim 2, wherein resolving the conflict between the conflicting groups comprises at least one of:
   determining that one group of the conflicting groups is a superset of all other groups of the conflicting groups; and
   determining that one group of the conflicting groups is a proper subset of all other groups of the conflicting groups.

4. The computer-implemented method of claim 2, wherein resolving the conflict between the conflicting groups comprises:
   selecting a rule from the rules assigning devices to conflicting groups to modify the client device's group assignment; and
   notifying an administrator to formulate a new rule that resolves the conflict between the conflicting groups.

5. The computer-implemented method of claim 1:
   further comprising identifying a configuration setting of the attribute that improves utility of the client device; and
   wherein the rule that defines conditions for assigning client devices to groups initiates application of the configuration setting to the attribute of the client device.

6. The computer-implemented method of claim 5, further comprising, in response to determining that the client device's group assignment should be modified, applying the configuration setting to the attribute of the client device.

7. The computer-implemented method of claim 1, wherein the attribute comprises at least one of:
   a data loss prevention policy;
   a directory services setting;
   a software application configuration setting;
   a network setting;
   a device resource setting;
   an operating system configuration setting; and
   a device security setting.

8. The computer-implemented method of claim 1, wherein the event associated with the client device comprises at least one of:
   a login event;
   a device security threat event;
   a directory services change event;
   a software application change event;
   a network connection event;
   a device change event; and
   an operating system configuration event.

9. The computer-implemented method of claim 1, wherein discovering the attribute of the client device comprises discovering at least one attribute of a user of the client device.

10. The computer-implemented method of claim 1, wherein identifying the rule that defines conditions for assigning client devices to groups comprises:
   obtaining, using information that identifies the discovered attribute of the client device, the rule by querying a database that associates conditions for assigning client devices to groups with rules for assigning client devices to groups.

11. The computer-implemented method of claim 1, wherein the condition for assigning client devices to groups comprises a logical combination of attributes of client devices.

12. A system for dynamically configuring computing system group assignments based on detected events, the system comprising:
   an event module, stored in memory, that detects an event associated with a client device that potentially impacts a group to which the client device is assigned;
   a client analysis module, stored in memory, that, in response to detecting the event, discovers at least one attribute of the client device that potentially impacts the client device's group assignment;
   a rule analysis module, stored in memory, that identifies at least one rule that defines conditions for assigning client devices to groups by formulating a dynamic rule that associates at least one condition associated with the client device with an alternate group;
   an assignment module, stored in memory, that:
      determines, by applying the rule to the discovered attribute of the client device, that the client device's group assignment should be modified to that of the alternate group;
      in response to determining that the client device's group assignment should be modified, modifies the client device's group assignment based on the discovered attribute of the client device; and
   at least one physical processor configured to execute the event module, the client analysis module, the rule analysis module, and the assignment module.

13. The system of claim 12, wherein the rule analysis module identifies the rule that defines conditions for assigning client devices to groups by:
   identifying a plurality of rules that define conditions for assigning the client device to a plurality of groups;
   determining that the client device satisfies conditions of a plurality of groups, resulting in a conflict;
   resolving the conflict between the conflicting groups; and
   in response to resolving the conflict between the conflicting groups, modifying the client device's group assignment.

14. The system of claim 13, wherein the rule analysis module resolves the conflict between the conflicting groups by at least one of:
   determining that one group of the conflicting groups is a superset of all other groups of the conflicting groups; and
   determining that one group of the conflicting groups is a proper subset of all other groups of the conflicting groups.

15. The system of claim 13, wherein the rule analysis module resolves the conflict between the conflicting groups by:
   selecting a rule from the rules assigning devices to conflicting groups to modify the client device's group assignment; and
   notifying an administrator to formulate a new rule that resolves the conflict between the conflicting groups.

16. The system of claim 12, wherein:
   the client analysis module identifies a configuration setting of the attribute that improves utility of the client device; and
   the rule that defines conditions for assigning client devices to groups initiates application of the configuration setting to the attribute of the client device.

17. The system of claim 16, further comprising a client configuration module, stored in memory, that in response to determining that the client device's group assignment should be modified, applies the configuration setting to the attribute of the client device.

18. The system of claim 12, wherein the attribute comprises at least one of:
   a data loss prevention policy;
   a directory services setting;
   a software application configuration setting;
   a network setting;
   a device resource setting;
   an operating system configuration setting; and
   a device security setting.

19. The system of claim 12, wherein the event associated with the client device comprises at least one of:
   a login event;
   a device security threat event;
   a directory services change event;
   a software application change event;
   a network connection event;
   a device change event; and
   an operating system configuration event.

20. A non-transitory computer-readable medium comprising one or more computer-readable instructions that, when executed by at least one processor of a computing device, cause the computing device to:
   detect an event associated with a client device that potentially impacts a group to which the client device is assigned;
   discover at least one attribute of the client device that potentially impacts the client device's group assignment;
   identify at least one rule that defines conditions for assigning client devices to groups formulating a dynamic rule that associates at least one condition associated with the client device with an alternate group;
   determine, by applying the rule to the discovered attribute of the client device, that the client device's group assignment should be modified to that of the alternate group; and
   in response to determining that the client device's group assignment should be modified, modify the client device's group assignment based on the discovered attribute of the client device.

* * * * *